(12) United States Patent
Benaske

(10) Patent No.: US 8,454,270 B1
(45) Date of Patent: Jun. 4, 2013

(54) PORTABLE FOAM DISPENSING MACHINE

(76) Inventor: Mark J. Benaske, Rosebush, MI (US)

( * ) Notice: Subject to any disclaimer, the term of this patent is extended or adjusted under 35 U.S.C. 154(b) by 60 days.

(21) Appl. No.: 13/136,791

(22) Filed: Aug. 10, 2011

(51) Int. Cl.
*F16L 59/15* (2006.01)

(52) U.S. Cl.
USPC ............... 405/157; 222/146.2; 137/560

(58) Field of Classification Search
USPC ......... 405/157; 138/105; 222/146.2; 137/560
See application file for complete search history.

(56) References Cited

U.S. PATENT DOCUMENTS

| | | | | |
|---|---|---|---|---|
| 3,380,258 A | * | 4/1968 | Young | 405/155 |
| 3,722,225 A | * | 3/1973 | Empson | 405/157 |
| 4,069,684 A | * | 1/1978 | Wilson | 405/157 |

* cited by examiner

*Primary Examiner* — Tara M. Pinnock
(74) *Attorney, Agent, or Firm* — Robert L. McKellar; McKellar IP Law, PLLC

(57) ABSTRACT

A foam dispensing apparatus for dispersing foamed material into an excavation containing pipelines and a novel power head for dispersion of foam.

8 Claims, 8 Drawing Sheets

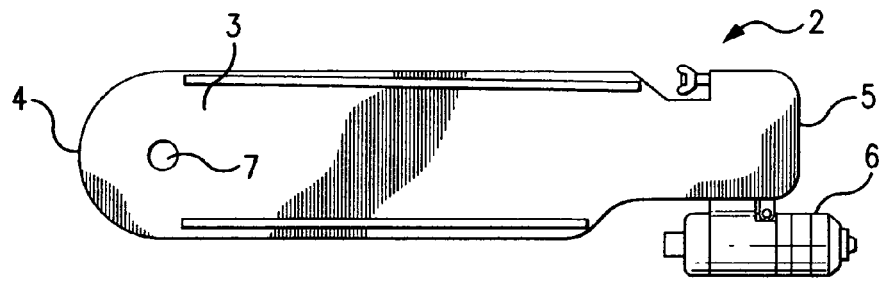
FIG. 2A
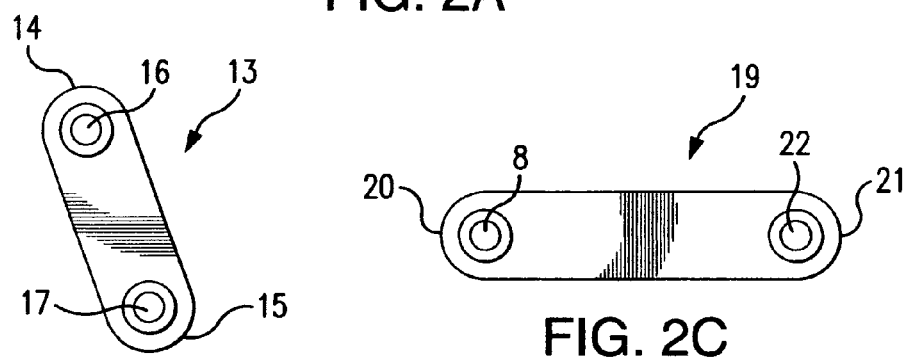
FIG. 2B
FIG. 2C
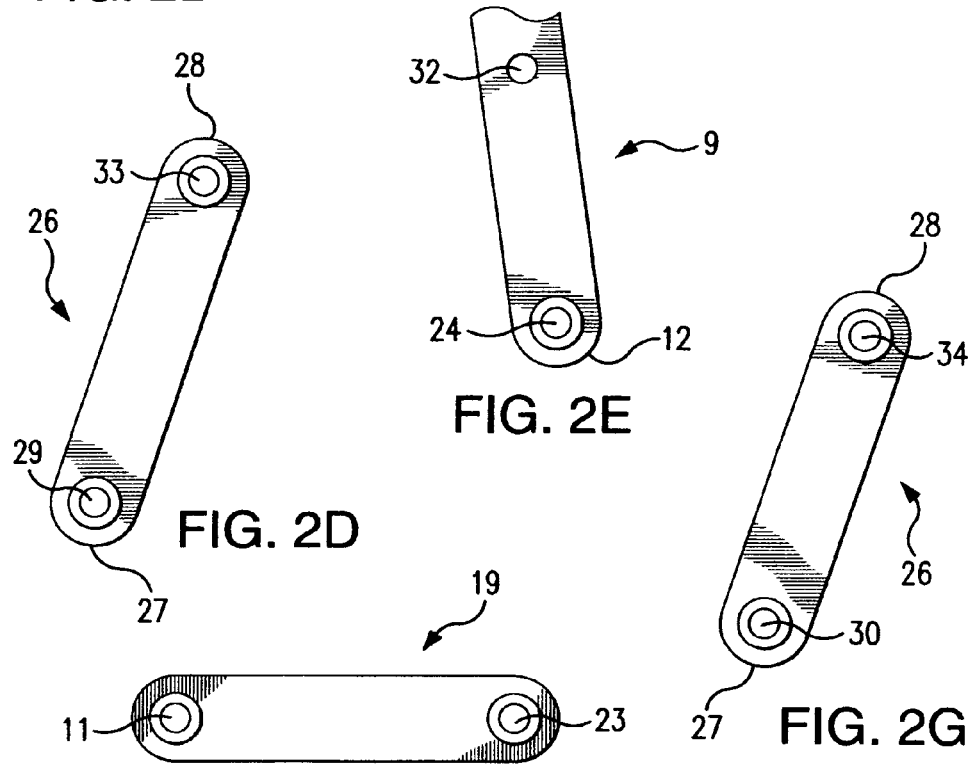
FIG. 2D
FIG. 2E
FIG. 2F
FIG. 2G

PORTABLE FOAM DISPENSING MACHINE

BACKGROUND OF THE INVENTION

The device of this invention has great utility in placing foamed material into excavations containing pipelines.

Many miles of pipelines are laid into excavations throughout the United States every year. The pipelines are utilized for carrying many varied materials, such as salt water, natural gas, crude oil, and the like.

For certain materials, there is a need to provide insulation on the pipelines in order to allow the materials therein to flow properly and without having to provide excessive pumping facilities and the like to convey such materials, as such facilities are costly. In addition, foam beds are laid in the excavation so that the pipeline has protection from the underlaying earth and debris.

Moreover, bags are filled with foam and used as pillows in the excavation under the pipeline in order to support and protect the pipeline. Finally, the foam is used as a "trench breaker", that is a foam barrier laid across the excavation to stop the flow of dirt and water running down the length of the pipeline into wetlands and water bodies.

When used as insulation, the insulation provides protection from both extremely hot days and also for extremely cool days, especially extremely cool days in which the contents of the pipelines have a tendency to freeze up or at least greatly increase in viscosity such that they cannot be transported through the pipeline readily.

Means for providing insulation in the last couple of decades has been by way of the use of fibrous insulation materials wherein the pipelines were wrapped with continuous rolls of such insulative material and taped into place.

Later uses of insulation material included the use of foam that was placed into the excavation around the pipes. The prior art methods typically used were methods in which reactive foam ingredients were dispensed into a container and the contents of the container were virtually dumped into the excavation and smoothed or configured using shovels and the like.

The instant invention overcomes the prior art problems with foam insulation, protection, barrier properties for debris and water from entering wetlands, for pipelines.

THE INVENTION

Thus, what is disclosed and claimed herein is a foam dispensing apparatus for dispersing foamed material. The foam dispensing apparatus comprises in combination a base frame and surmounted on the base frame, an engine for providing power.

The engine has a water cooled radiator connected to it to keep the engine cool. There is a control cab, wherein the control cab has sufficient controls to control mixing of the foaming ingredients, control delivery of the mix, and control the hydraulics.

At a first end of the base frame, there is a utility box, the utility box being comprised of at least one holding tank; at least one reactor; at least one reactor hose; at least one electrical panel to house electrical gear; at least one compressor; at least one filter means; at least one heater; at least one transfer hose; at least one means of drying incoming air.

The apparatus has mounted at a second end of the base frame, a hydro tank. The apparatus also has rotatably mounted at the second end of the base frame, a mounting bracket for a moveable hydraulic multi-segmented arm wherein the multi-segmented arm is mounted in the mounting bracket by a near end of an immovable arm. Said immovable arm has a distal end.

There is a moveable second arm mounted near the distal end of the immovable first arm using a first round pin such that the moveable second arm can partially rotate around the first round pin, the moveable second arm having a distal end.

The distal end of the second arm is attached to a power head (to be described infra).

There is in addition, sufficient hydraulics to move the arms and sufficient delivery hoses to deliver foaming product from the reactor to the dispensing gun of the power arm.

In a second embodiment, there is a power head for the powered foam dispensing apparatus, the power head comprising a mounting bracket having a near end that has a terminal end, and a distal end.

Mounted on the distal end of the mounting bracket, there is a foam dispensing gun. The near end of the mounting bracket has a first opening through it, near the terminal end.

There is a main beam. The main beam has a distal end and a second opening through it near the distal end. The main beam is attached to a mechanical power source at the near end. The mounting bracket has a lower arm fixedly attached to it. The lower arm has a near end and a distal end, there being a third opening near the near end and a fourth opening near the distal end.

The first opening, second opening, and third opening are aligned to receive a common, round pin and there is a first round pin through the first, second and third openings.

The lower arm is bracketed by a first yoke having distal ends and near ends, the first yoke near ends having a fifth opening and a sixth opening through them respectively, and the distal ends having a seventh opening and an eighth opening through them.

The fourth opening, fifth opening and sixth opening are aligned to receive a second common, round pin and there is a second round pin through the fourth, fifth, and sixth openings. The near ends of the first yoke are bracketed by a second yoke, the second yoke having near ends and distal ends. There is a ninth opening and a tenth opening through the near ends of the second yoke. The seventh, eighth, ninth and tenth openings are aligned to receive a common round pin and there is a third round pin through the seventh, eighth, ninth, and tenth openings.

The distal ends of the second yoke bracket the main beam at a thirteenth opening, at a point distant from the third opening. The distal ends of the second yoke have an eleventh and a twelfth opening, respectively, the eleventh opening, twelfth opening and thirteenth opening being aligned to receive a common, round pin, and there is a fourth round pin through the eleventh, twelfth, and thirteenth openings.

There is a foam transfer dispensing hose attached to the foam dispensing gun, a trigger mechanism for opening the foam dispensing gun for discharge of foam, an assembly for attaching to a control mechanism for the trigger, and, a control mechanism for controlling the opening and closing of the foam dispensing gun.

BRIEF DESCRIPTION OF THE DRAWINGS

FIG. 2A is a full side view of the mounting bracket for the foam gun.

FIG. 2B is a full side view of the lower arm.

FIG. 2C is a full side view of the first yoke.

FIG. 2D is a full side view of the second yoke.

FIG. 2E is a side view of a portion of the main beam.

FIG. 2F is a full side view of the opposite side of FIG. 2C.

FIG. 2G is a full side view of the opposite side of FIG. 2D.

DETAILED DESCRIPTION OF THE DRAWINGS

Figure 1:
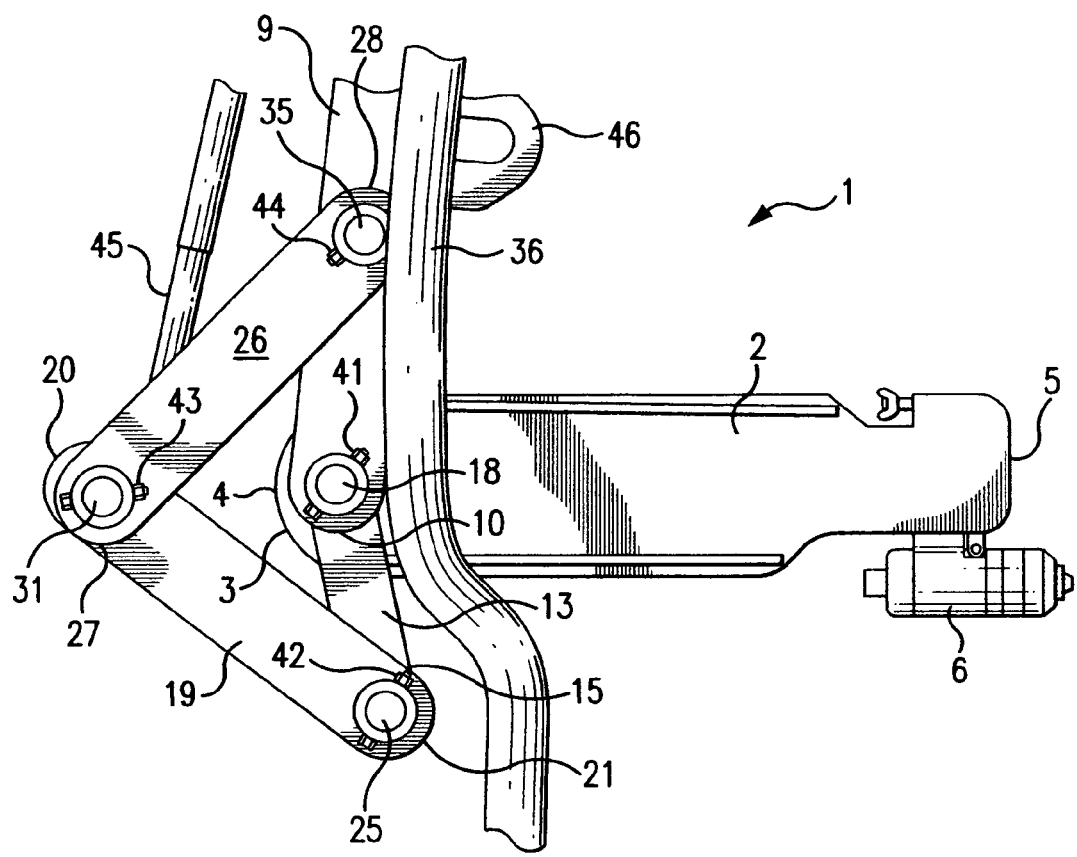
FIG. 1 is a full side view of the power head of this invention.

Turning now to the invention and a detailed description of the drawings, attention is directed to FIG. 1, which is a full side view of a power dispensing head 1 of this invention.

The power head 1 is comprised of an apparatus that is fitted on the front of the foam producing machine of this invention.

There is a mounting bracket 2 having a near end 3 and a terminal end of 4 the near end 3, along with a distal end 5. Mounted on the distal end 5 of the mounting bracket 2 is a foam dispensing gun 6.

The near end 3 of the mounting bracket 2 has a first opening 7 through it (not shown in this Figure, see FIG. 2), near the terminal end 4.

There is a main beam 9 having a distal end 10 and a near end 12, and a second opening 11 through it (not shown in this Figure, see FIG. 2). The main beam 9 is attached at its near end 12 to a mechanical power source (not shown, see FIG. 5). The mounting bracket 2 has a lower arm 13 fixedly attached to it that moves in the same direction with the mounting bracket 2 whenever the mounting bracket 2 is moved. The lower arm 13 has a near end 14 and a distal end 15 and there is a third opening 16 near the near end 14 along with a fourth opening 17 near the distal end 15.

The first opening 7, the second opening 11, and third opening 16 (none of which are shown in this Figure, see FIG. 2) are aligned to receive a common, round pin 18 that allows the mounting bracket 2 to partially rotate around the pin 18. Shown is the pin 18 in place.

The lower arm 13 is bracketed by a first yoke 19 having distal ends 20 and near ends 21, the near ends 21 of the first yoke 19 have a fifth opening 22 (not shown in this Figure, see FIG. 2) and a sixth opening 23 through it (not shown in this Figure, see FIG. 2) and the distal ends 20 have a seventh opening 8 and an eighth opening 11 through them.

The fourth opening 17, the fifth opening 22, and the sixth opening 23 are aligned to receive a second common, round pin 25 that allows the yoke 19 to partially rotate around pin 25. Shown is the pin 25 in place.

The near ends 21 of the first yoke 19 are bracketed by a second yoke 26, the second yoke 26 having near ends 27 and distal ends 28. There is a ninth opening 29 and a tenth opening 30 through the near ends 27. The seventh, eighth, ninth and tenth openings are aligned to receive a common round pin 31 that allows the yoke 26 to partially rotate around pin 31. Shown is the pin 31 in place.

The distal ends 28 of the second yoke 26 bracket the main beam 9 at a thirteenth opening 32, at a point distant from the third opening 16. The distal ends 28 of the second yoke 26 have an eleventh opening 33 and a twelfth opening 34, respectively. The eleventh opening 33, the twelfth opening 34 and the thirteenth opening 32 are aligned to receive a common, round pin 35. The round pin 35 is inserted in the eleventh opening 33, the twelfth opening 34, and the thirteenth opening 32.

There is a foam transfer dispensing hose 36 attached to the foam dispensing gun 6. The foam dispensing gun 6 has a trigger 37. The power head 1 has a trigger mechanism 28 that is attached to the power head 1 through a bracket assembly 38 that is used for controlling the gun 6. The trigger mechanism 39 is controlled by a controller mechanism 40 (not shown) from inside the cab of the machine that the foam equipment is mounted on. All of the pins 18, 25, 31, and 35 of the power head 1 are held in place by a bolt, namely, 41, 42, 43, and 44.

The power head 1 as just described Supra is driven by a hydraulic cylinder 45 which is connected to a mechanical source 46 shown in Figure Also shown is a lifting bracket 46.

Turning now to FIGS. 2A through 2G, there is shown an exploded view of the power head 1 such that the openings can be shown therein. With reference to FIG. 2A, there is shown the mounting bracket 2, the distal end 5, near end 3, the terminal end 4, of the near end 3, the gun 6, and the opening 7.

With reference to FIG. 2B, which is the lower arm 13, there is shown the near end 14, and the opening 16, the distal end 15, the opening 17.

With reference to FIG. 2C, there is shown the first yoke 19, the near end 21, and the opening 22, the distal end 20 and the opening 8.

With reference to FIG. 2D, there is shown the second yoke 26, and the near end 27, with opening 29, and distal end 28 with opening 33.

With reference to FIG. 2E, there is shown the side view of the lower half of the main bean 9. Also shown is the near end 12 and the openings 24 and 32.

With reference to FIG. 2F, which is the opposite side of FIG. 2C, there is shown the openings 11 and 23 and in FIG. 2G, which is the opposite side view of FIG. 2D, there is shown the near end 27 with openings 30, and distal end 28 with opening 34.

Figure 3:
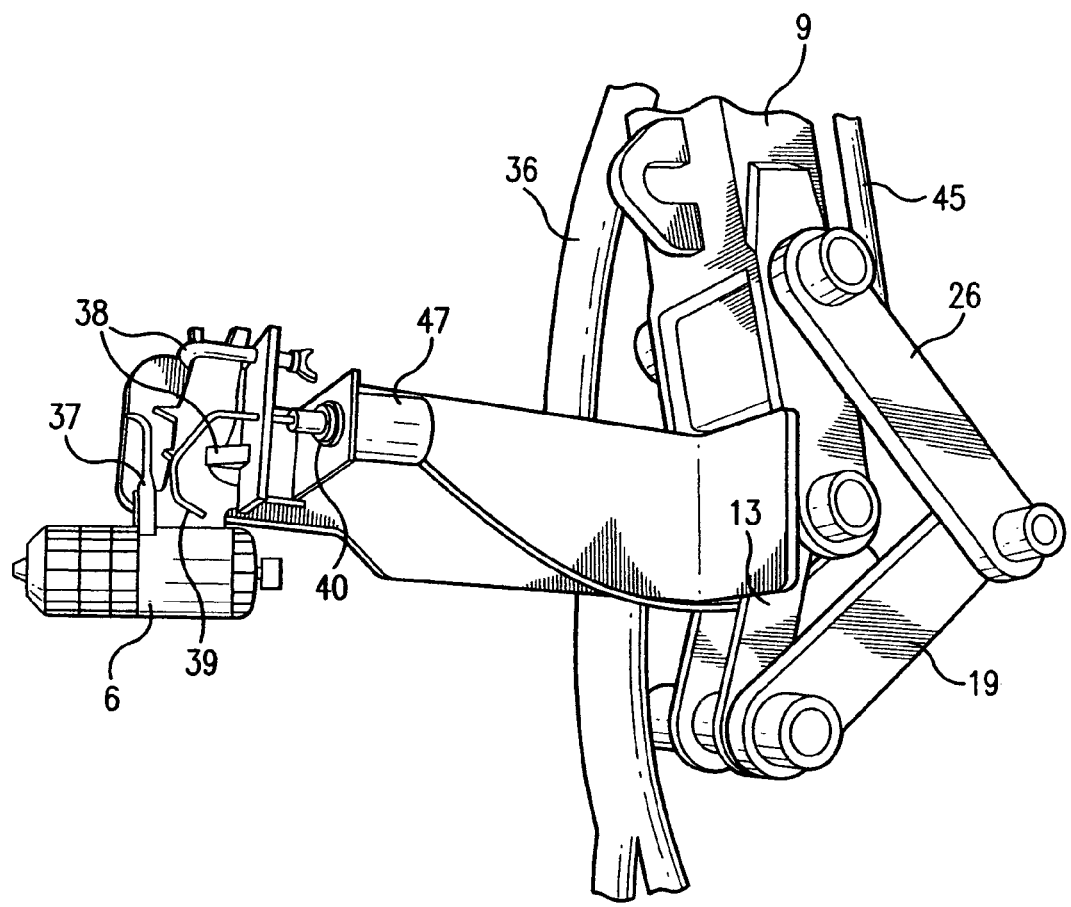
FIG. 3 is an opposite side view of FIG. 1, in order to shown the gun 6 and its assemblies.

FIG. 3 is an opposite side view of FIG. 1, in order to shown the gun 6 and its assemblies. Shown is the support beam 9, the hydraulic cylinder drive unit 45, the foam hose 36, the main beam 9, the first yoke 19, and the second yoke 26. For purposes of clarity, the foam hose 36 is not attached to the gun 6.

There is shown the trigger 37 of the gun 6, the bracket assembly 38 for holding the gun in place, the trigger mechanism 39 that operates the trigger 37 of the gun 6, the control mechanism 40 for the trigger mechanism 39, and an actuator 47.

Figure 4:
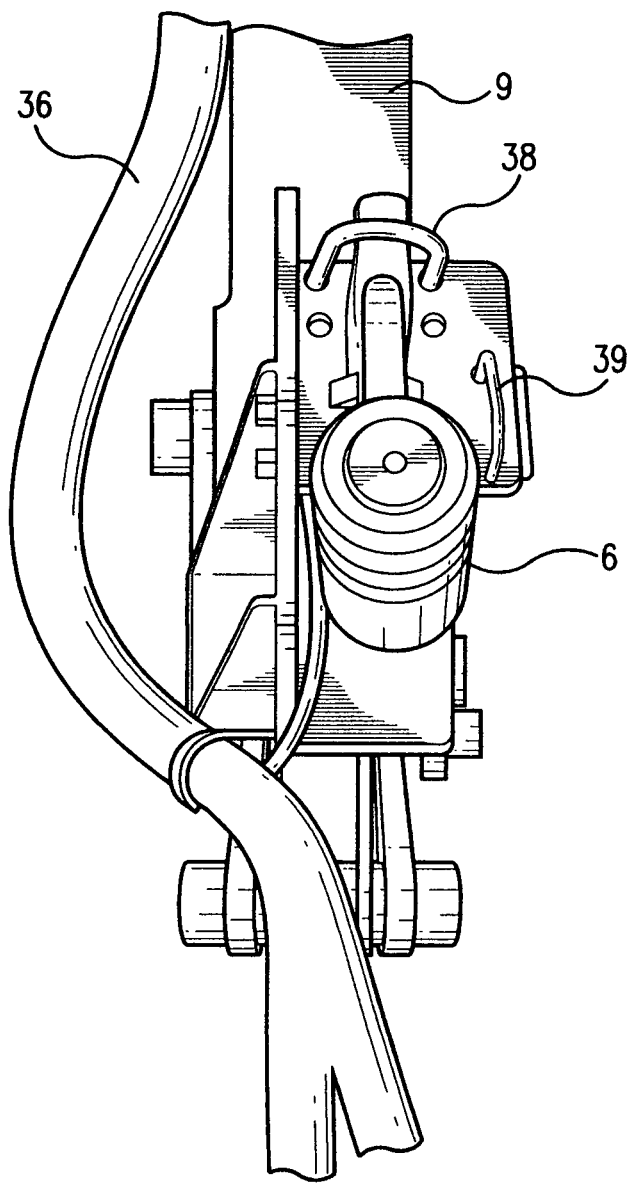
FIG. 4 is a front view of the power head 1.

FIG. 4 is a front view of the power head 1 wherein like numbers indicate like components.

Figure 5:
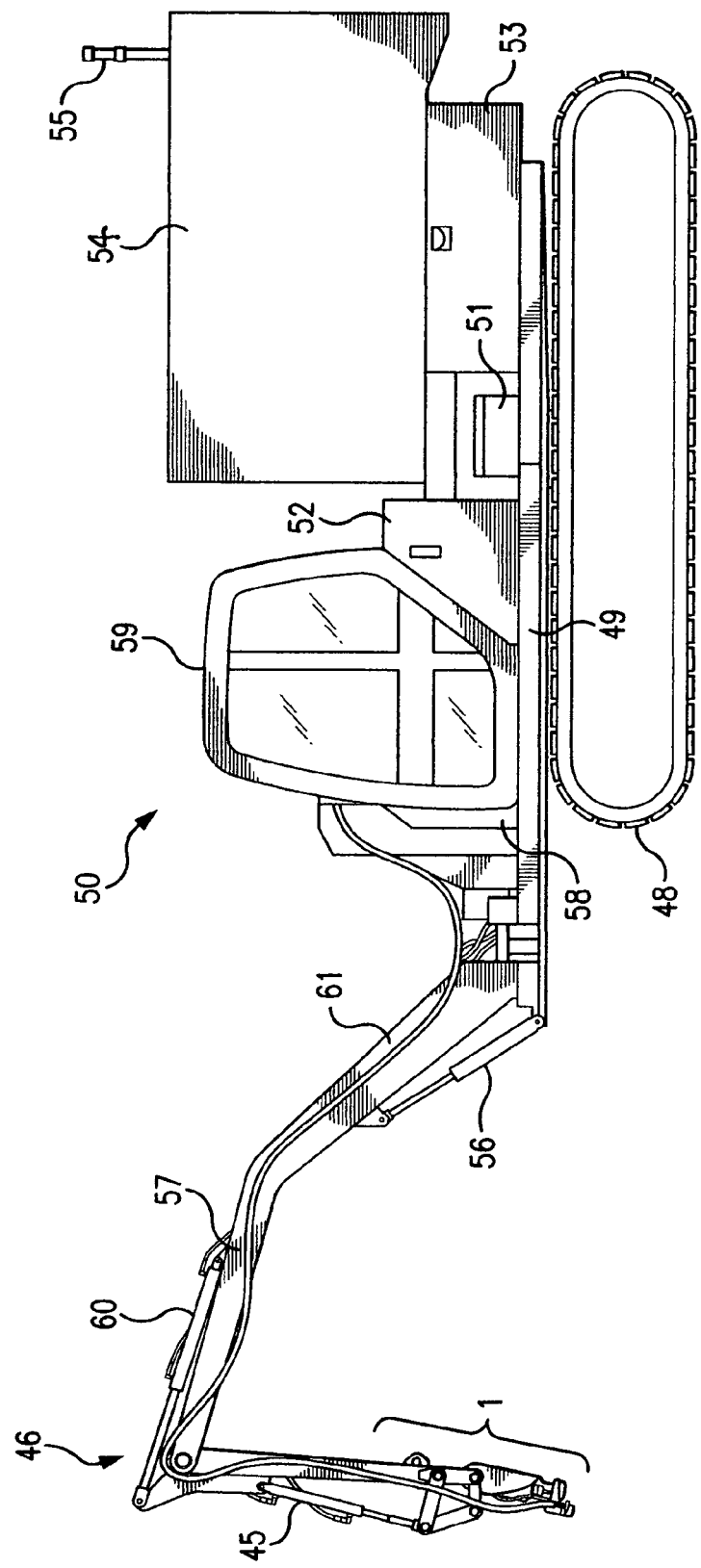
FIG. 5 is a full side view of a foam dispensing machine of this invention.

Turning now to FIG. 5, which is a full side view of a foam dispensing machine 50 of this invention, there is shown moveable tracks 48, a platform (base frame) 49 on which the apparatii rest, a battery box 51, a fuel tank 52, a tool box 53, a holding tank 54, a material pump 55, the foam hose 36, a hydraulic cylinder 56 for moving the moveable arm 57, the main beam 9, the hydraulic cylinder 45, the hydraulic cylinder 60, a moveable arm 61, the power head 1, a hydro tank 58, and the cab 59.

Figure 6:
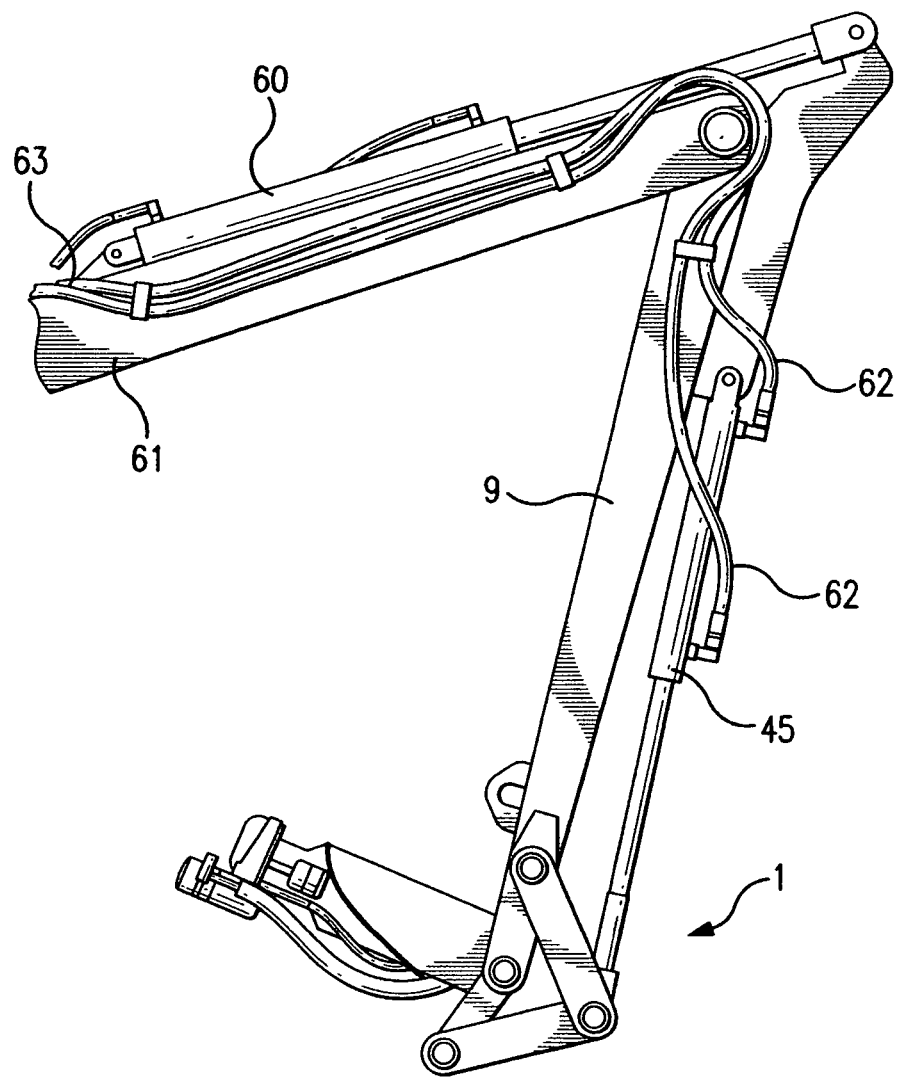
FIG. 6 is a full side view of the power head 1 of this invention.

FIG. 6 is a full side view of the power head 1 of this invention showing the hydraulic hoses 62 and 63 for the respective, hydraulic cylinders 45 and 60.

Figure 7:
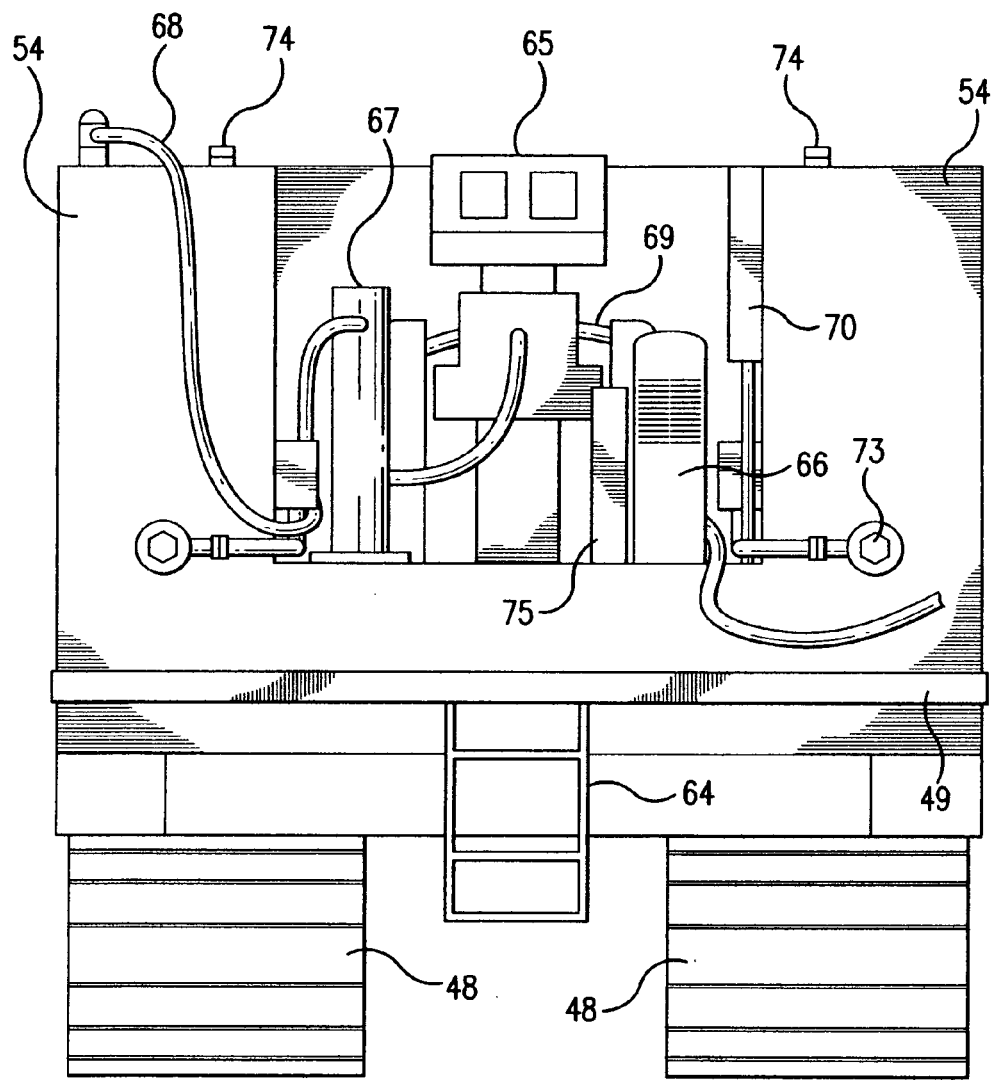
FIG. 7 shows a rear view of the back of the machine.

FIG. 7 shows a rear view of the back of the machine 50 in which there is shown a partially enclosed box-like structure having holding tanks 54 on either side. Mounted at the back of the box-like structure is a ladder 64 for convenience in mounting the box-like structure to enable one to deal with the foaming equipment therein. Also shown are the tracks 48.

The foaming equipment mainly consists of a reactor 65, a reactor hose 69, a compressor 66, a filter apparatus 67, and a transfer hose 68 from the filter apparatus 67 to the gun 6, electrical 70, a heater 73, a air drying element 74, one on each holding tank 54, and a generator 75. All of this foaming equipment is commercially available and great detail is not required herein.

Figure 8:
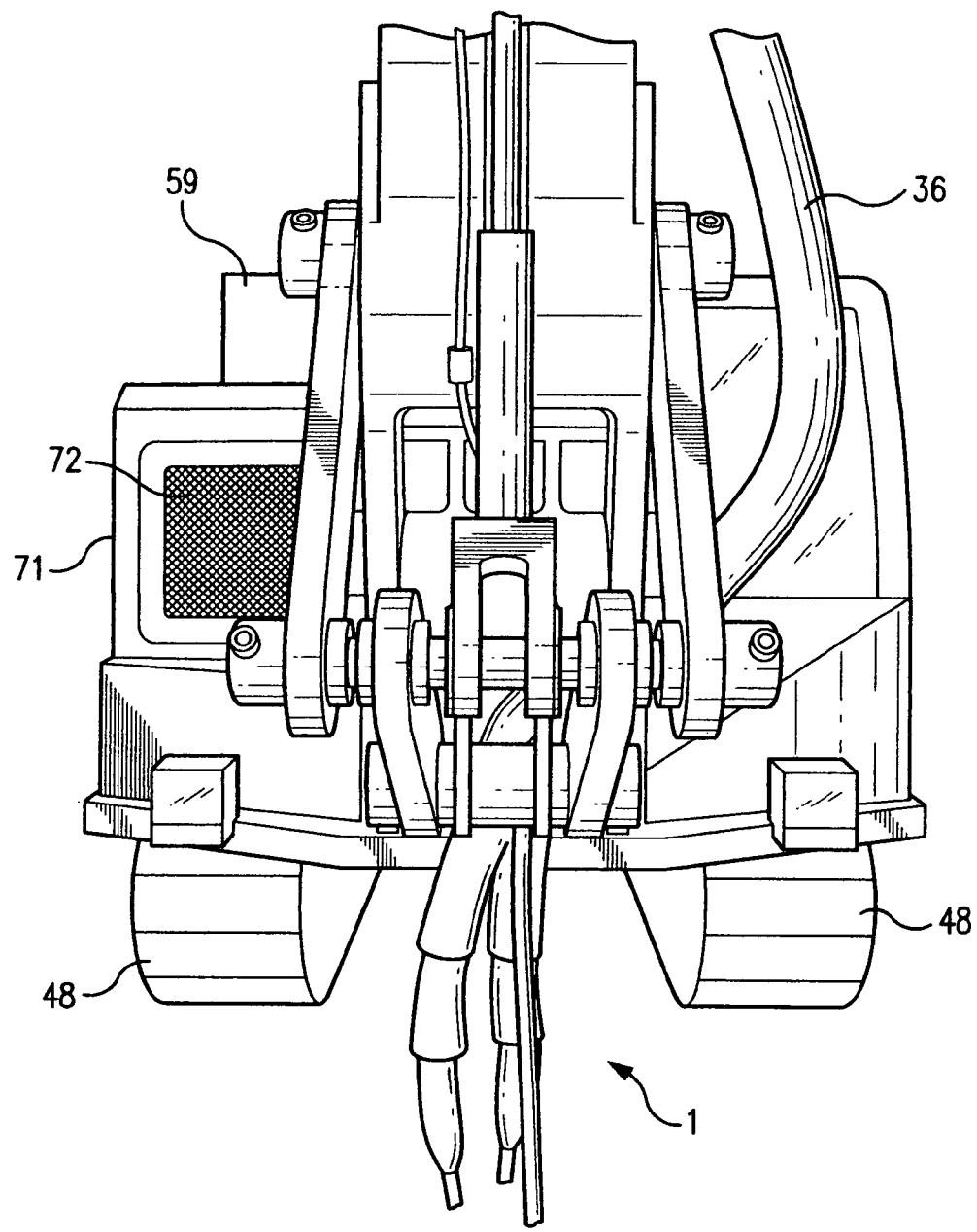
FIG. 8 shows a front perspective view.

FIG. 8 is a perspective view from the front showing the power head 1, the tracks 48, an engine 71, a radiator 72 for the engine 71.

What is claimed is:

1. A power head for a powered foam dispensing apparatus, said power head comprising:
    a mounting bracket having a near end that has a terminal end, and a distal end;
    mounted on the distal end of the mounting bracket, a foam dispensing gun;
    the near end of the mounting bracket having a first opening therethrough, near the terminal end;
    a main beam, said main beam having a distal end and a second opening therethrough, near the distal end; said main beam being attached to a mechanical power source at the near end; said mounting bracket having a lower arm fixedly attached thereto, said lower arm having a near end and a distal end, there being a third opening near the near end and a fourth opening near the distal end;
    said first opening, second opening, and third opening being aligned to receive a common, round pin;
    a first round pin through the first, second and third openings;
    said lower arm being bracketed by a first yoke having distal ends and near ends, said first yoke near ends having a fifth opening and a sixth opening therethrough, respectively, and the distal ends having a seventh opening and an eighth opening therethrough,
    said fourth opening, fifth opening and sixth opening being aligned to receive a second common, round pin;
a second round pin through the fourth, fifth, and sixth openings;
    the near ends of the first yoke being bracketed by a second yoke, said second yoke having near ends and distal ends, there being a ninth opening and a tenth opening through the near ends thereof;
    said seventh, eighth, ninth and tenth openings being aligned to receive a common round pin;
    a third round pin through the seventh, eighth, ninth, and tenth openings;
    the distal ends of the second yoke bracketing the main beam at a thirteenth opening, at a point distant from the third opening, the distal ends of the second yoke having an eleventh and twelfth openings, respectively;
    said eleventh opening, twelfth opening and thirteenth opening being aligned to receive a common, round pin;
a fourth round pin through the eleventh, twelfth, and thirteenth openings;
    a foam transfer dispensing hose attached to the foam dispensing gun;
    a trigger mechanism for opening the foam dispensing gun for discharge of foam;
    an assembly for attaching to a control mechanism for the trigger, and,
    a control mechanism for controlling the opening and closing of the foam dispensing gun.

2. A foam dispensing apparatus for dispersing foamed material, said foam dispensing apparatus comprising in combination:
    a base frame and surmounted on said base frame, an engine for providing power, said engine having a water-cooled radiator connected thereto;
    a control cab, said control cab having sufficient controls to control mixing of the foaming ingredients, control delivery of the mix, and control of the hydraulics;
    at a first end of the base frame, a utility box, said utility box comprised of at least one holding tank;
    at least one reactor;
    at least one reactor hose;
    at least one electrical panel to house electrical gear;
    at least one compressor;
    at least one filter means;
    at least one heater;
    at least one transfer hose;
    at least one means of drying incoming air;
    said apparatus having mounted at a second end of the base frame, a hydro tank;
    said apparatus having rotatably mounted at the second end of the base frame, a mounting bracket for a moveable hydraulic multi-segmented arm;
    said multi-segmented arm being mounted in the mounting bracket by a near end of an immovable arm, said first arm having a distal end;
    a moveable second arm being mounted near the distal end of the immovable first arm using a first round pin, such that the moveable second arm can partially rotate around the first round pin, said moveable second arm having a distal end;
    the distal end of the second arm being attached to a power head as claimed in claim 1;
    sufficient hydraulics to move the arms;
    sufficient delivery hoses to deliver foaming product from the reactor to the dispensing gun of the power arm.

3. The foam dispensing apparatus for dispersing foamed material, as claimed in claim 2 wherein, in addition, the base frame is mounted on a means to provide a mobile foam dispensing apparatus for dispersing foamed material.

4. The foam dispensing apparatus for dispersing foamed material, as claimed in claim 3 wherein the means is a set of wheels.

5. The foam dispensing apparatus for dispersing foamed material, as claimed in claim 3 wherein the means is a set of powered, rotatable tracks.

6. The foam dispensing apparatus for dispersing foamed material, as claimed in claim 3 wherein the means is a sled.

7. A process for delivering foaming material to a pipeline, said process comprising:
    providing contained foamed material adjacent a pipeline using the apparatus of claim 2;
    delivering the foamed material in and around the pipeline using the apparatus;
    allowing the foamed material to cure to a solid foam.

8. The process as claimed in claim 7 wherein a second layer of foaming material is placed over a first layer of cured solid foam.

* * * * *